Oct. 21, 1952 J. H. HOLBEN 2,614,849
DISTRIBUTOR FOR LOOSE MATERIAL
Filed July 26, 1948 4 Sheets-Sheet 1
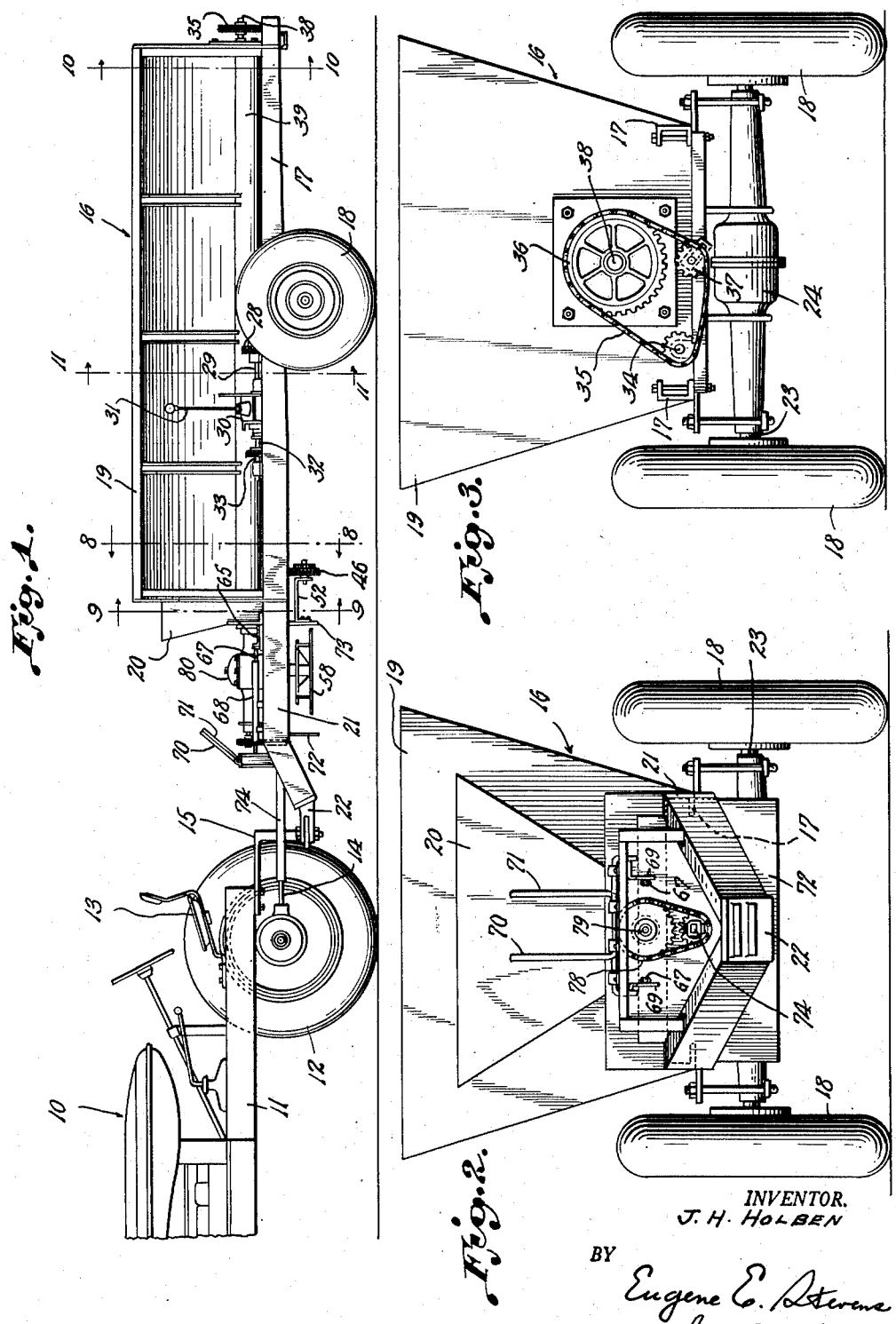
INVENTOR.
J. H. HOLBEN
BY
Eugene E. Stevens
ATTORNEY Oct. 21, 1952     J. H. HOLBEN     2,614,849
DISTRIBUTOR FOR LOOSE MATERIAL
Filed July 26, 1948     4 Sheets—Sheet 2
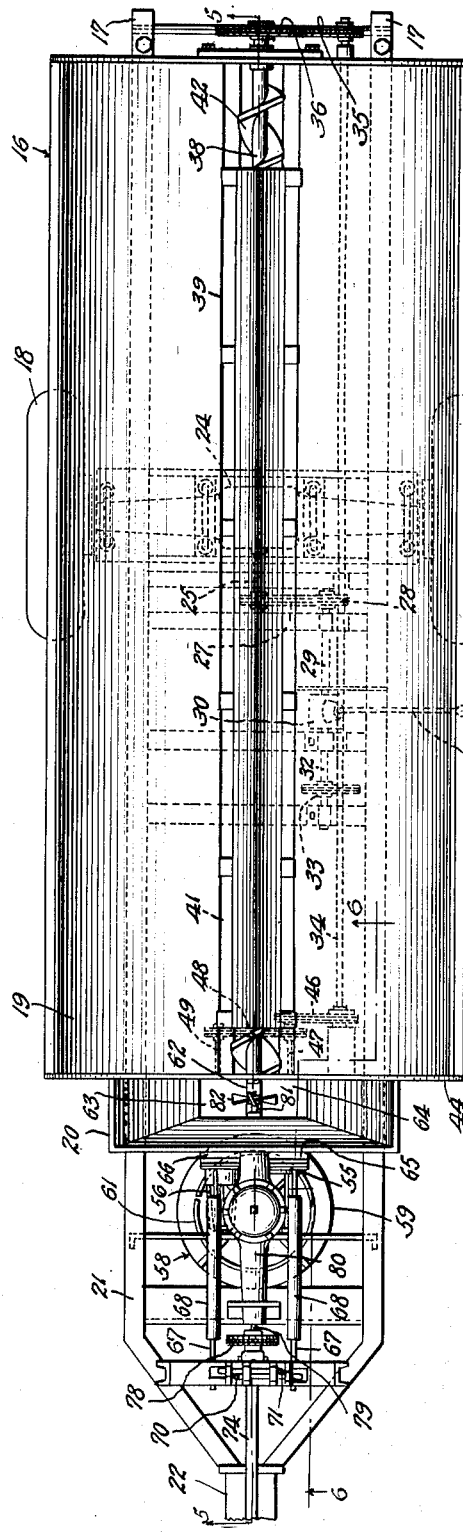
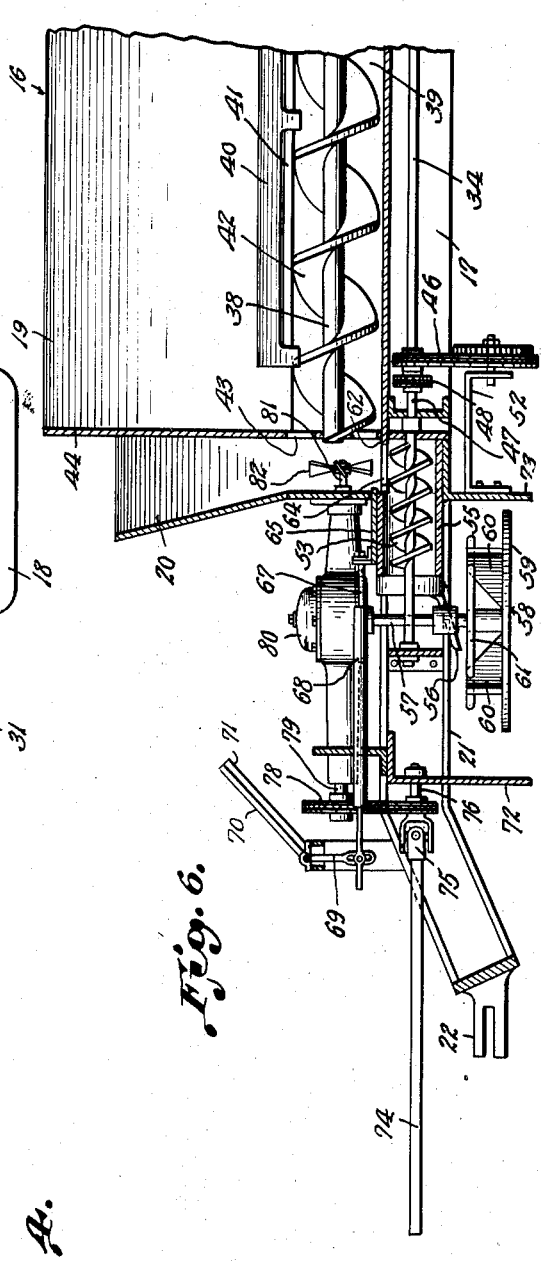
INVENTOR.
J. H. HOLBEN
BY
Eugene E. Stevens
ATTORNEY

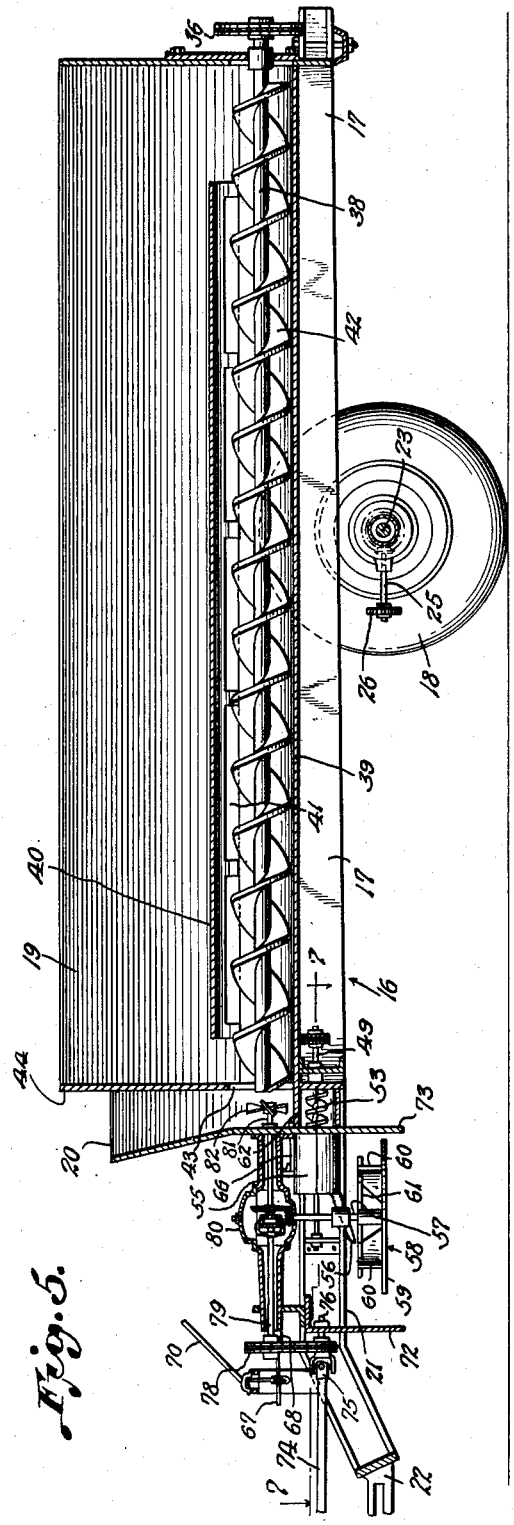

Oct. 21, 1952  J. H. HOLBEN  2,614,849
DISTRIBUTOR FOR LOOSE MATERIAL
Filed July 26, 1948  4 Sheets-Sheet 4
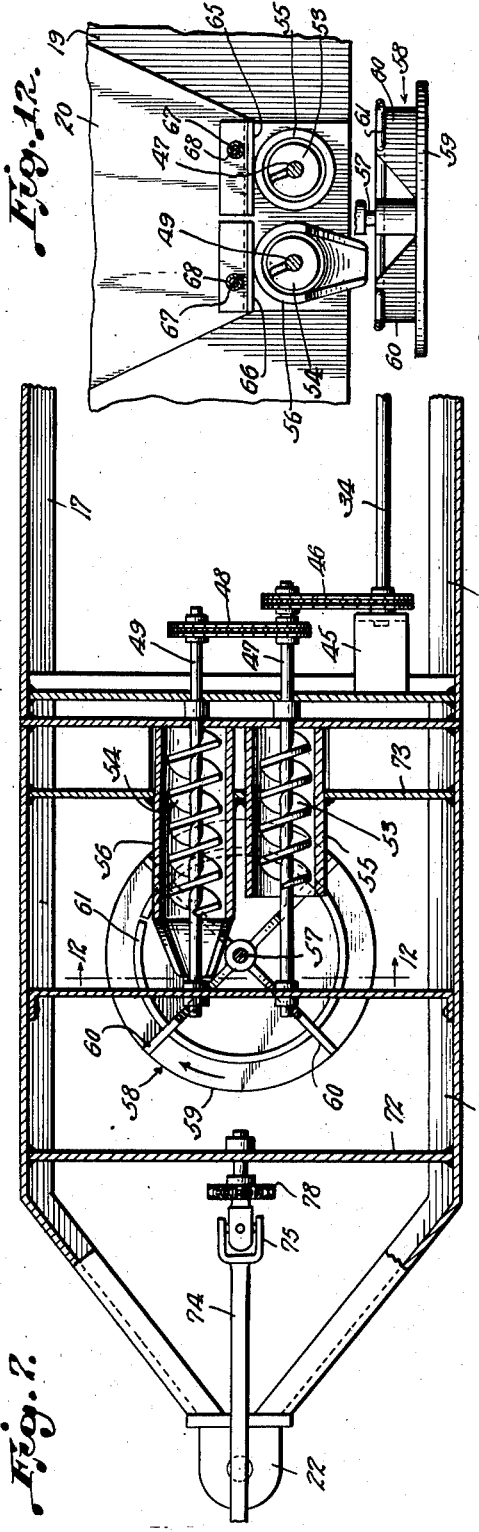
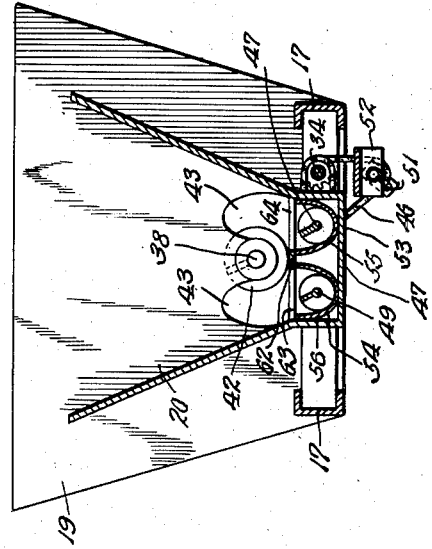
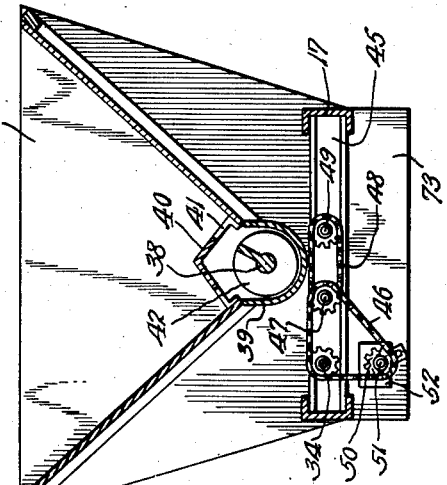
INVENTOR.
J. H. HOLBEN
BY Eugene E. Stevens
ATTORNEY Patented Oct. 21, 1952

2,614,849

UNITED STATES PATENT OFFICE 2,614,849

DISTRIBUTOR FOR LOOSE MATERIAL

James H. Holben, Lake Wales, Fla.

Application July 26, 1948, Serial No. 40,774

8 Claims. (Cl. 275—8)

My invention relates to distributors for loose material, and while not so limited, is particularly adaptable for the distribution of fertilizer.

More particularly, my invention is particularly adapted for the distribution of fertilizer to row crops wherein the rows are relatively widely spaced and/or to the distribution of fertilizer to the trees of an orchard, whereby not only are the rows of trees relatively widely spaced but the trees in each row are relatively widely spaced.

In the distribution of fertilizer to trees of an orchard, considerable difficulty has been had in distributing adequate amounts of fertilizer to each tree without wasting considerable fertilizer in the spaces between adjacent trees. Where the orchard or orchards are large, the lack of an adequate fertilizer distributor results in tremendous waste of fertilizer and frequently results in improper fertilizing of the trees.

With the foregoing in view, an object of my invention is to provide an improved fertilizer distributor.

A further object of the invention is to provide an improved fertilizer distributor or an improved distributor for other loose material, wherein the material distributed is selectively distributed to the right or to the left of a hopper, to both sides of the hopper simultaneously, or not at all.

A further object is to provide in the distributor for loose material such as that last described, means mounting a hopper and distributor on a vehicle, and means for controlling the distribution of the material, as aforesaid, which is juxtaposed relative to the operator of the vehicle.

A further object is to provide an improved distributor of loose material which is adapted to be drawn by a tractor, and wherein a hopper carried by the trailer is adapted to feed material to be distributed to a distributing means between the tractor and trailer, and wherein the control or controls for controlling the distribution of the material is juxtapositioned relative to the tractor and the operator for the same.

A further object of the invention is to provide an improved distributor for loose material which comprises a trailer including a hopper, said trailer being adapted to be drawn by a tractor, a distributing fan carried by said trailer, means for operating said fan from the power take-off shaft of the tractor, and conveyer means for feeding material from said hopper to said fan, and means for driving said conveyer means from the traction wheels of the trailer.

Other objects and advantages reside in the particular structure of the invention, combination and arrangement of the several parts, in the structure of the elements comprising the device, and/or in the particular method or mode of operation, all of which will be readily apparent to those skilled in the art upon reference to the attached drawings in connection with the following specification, wherein the invention is shown, described and claimed.

In the drawing—

Fig. 1 is an elevation of a preferred form of the invention showing the same attached to a tractor;

Fig. 2 is a front view of the device according to the invention apart from the tractor;

Fig. 3 is a rear view of the invention apart from the tractor;

Fig. 4 is a plan view of the invention, parts being broken away;

Fig. 5 is a longitudinal vertical section taken substantially on the plane of the line 5—5 of Fig. 4;

Fig. 6 is a fragmentary longitudinal vertical section on a slightly enlarged scale and taken substantially on the planes of the lines 6—6 of Fig. 4;

Fig. 7 is a fragmentary horizontal section taken substantially on the planes of the lines 7—7 of Fig. 5;

Fig. 8 is a transverse vertical section taken substantially on the plane of the line 8—8 of Fig. 1;

Fig. 9 is a transverse vertical section taken substantially on the plane of the line 9—9 of Fig. 1;

Fig. 10 is a transverse vertical section taken substantially on the plane of the line 10—10 of Fig. 1;

Fig. 11 is a transverse vertical section taken substantially on the plane of the line 11—11 of Fig. 1; and Fig. 12 is a fragmentary transverse vertical section taken substantially on the plane of the line 12—12 of Fig. 7.

Referring specifically to the drawing, wherein like reference characters have been used throughout the several views to designate like parts, 10 designates generally any suitable tractor including a frame 11, running gear 12, a seat 13, a power take-off shaft 14 and any suitable hitch member 15 for attaching a trailer according to the invention thereto. As so far described, the tractor and the related parts are conventional and form no part of my invention.

The trailer according to the invention is generally designated at 16 and comprises any suitable frame 17 which is adapted to be supported by at least two ground-engaging wheels 18 and which mounts thereon any suitable hopper 19. A minor hopper 20 is also carried by frame 17 forwardly of hopper 19 for a purpose to be described later.

The frame 17 is continued forwardly of the minor hopper 20 to provide a distributor-supporting portion 21 which terminates forwardly in a free end 22 formed to provide means for suitably connecting same to the hitch portion 15 of the tractor, Fig. 1. The wheels 18 may be rotatably mounted on axles 23 which may be connected together by any suitable well-known differential gearing enclosed in a suitable housing 24. A drive shaft 25 extends forwardly of the housing 24 and has a pinion gear 26 fixed on the forward free end thereof. This structure is best seen in Figs. 4, 5 and 11. As best seen in Figs. 4 and 11, the pinion or sprocket 26 is connected by any suitable means such as the chain 27 with a second pinion or sprocket 28 which is fixed on a drive shaft 29 for any suitable multi-speed transmission gearing diagrammatically indicated by 30. The transmission 30 is provided with any suitable or usual actuating gear shift handle 31. A driven shaft 32 extends upwardly of the transmission 30 in substantially opposite relation to the drive shaft 29. The driven shaft 32 is operatively connected in any suitable manner as by the chain and sprocket connection 33 with a longitudinally extending shaft 34. The several parts just described are suitably supported in any suitable or well-known manner on the frame 17 for the trailer 16.

The rear end of the shaft 34 is suitably journalled in the frame 17 and extends rearwardly thereof. The rear end of the shaft 34 has fixed thereon a suitable sprocket which is connected to a sprocket 36 for a conveyer by means of a chain or like device 35. Chain 35 also extends around an idler sprocket 37 which is adjustably supported on the frame 17 to provide means for tightening the chain 35. The conveyor sprocket 36 is fixed on the rear free end of the conveyer shaft 38 which extends longitudinally of the hopper 19 at the bottom thereof. A suitable screw conveyer 42 is formed around the conveyer shaft 38 and rotates in a trough 39 at the bottom of the hopper 19 in a well-known manner, whereby material is moved from the rear of the hopper 19 to the forward end thereof.

A peaked shed roof 40 may be positioned over the trough 39. Such roof 40 is preferably provided with elongated openings 41 in the region of the eaves thereof to permit the free passage of material to the conveyer while at the same time preventing the weight of the bulk of the material to be distributed from being imposed upon the conveyer. The forward end of the shaft 38 for the conveyer 42 is journalled in the forward wall 44 of the hopper 19 intermediate a pair of discharge openings 43 formed therein. Thus, material from the hopper 19 is discharged by the conveyer 42 forwardly of the hopper 19 into the minor hopper 20.

The forward end of the elongated shaft 34 is journalled in a suitable bracket 45 on the frame 17 and is connected by any suitable chain and sprocket mechanism or the like 46 to a conveyer shaft 47. The conveyer shaft 47 is operatively connected in any suitable manner as by the chain and sprocket means 48 to a second and laterally spaced conveyer shaft 49. The purpose of the conveyer shafts 47 and 49 will become apparent later. The chain 46 may be extended around an idler sprocket 50 which may be mounted on a stub shaft 51 which in turn may be adjustably mounted on a bracket 52 to permit tightening of the chain 46 in a well-known manner. The conveyer shafts 47 and 49 extend forwardly of the hopper 19 below the hopper 20. The shafts 47 and 49 are journalled for rotation in suitable frame members of the frame 17 and the forward extension 21 thereof. A suitable screw conveyer 53 is formed around the shaft 47 and a like screw conveyer 54 is formed around the shaft 49. The conveyers 53 and 54 rotate respectively in conduits 55 and 56 which likewise extend forwardly below the minor hopper 20. The conduits 55 and 56 terminate forwardly in free ends, but as is readily apparent from Fig. 7, the conduit 56 is substantially longer than the conduit 55 whereby it discharges forwardly of a vertical axis 57 for a fan 58. The axis or shaft 57 for the fan 58 is vertically disposed and is suitably journalled in frame members of the forward extension 21 of the frame. It should be noted also, Fig. 7, that the forward end of the conduit 55 discharges onto the fan rearwardly of the shaft 57 and on the opposite side from the conduit 56.

The fan 58 comprises a horizontally disposed disc 59 fixed on the lower end of the shaft 57 and a plurality of radially extending blades 60 in upstanding relation to the disc 59 and fixed to the upper surface thereof. The blades 60 may be strengthened by an annulus 61 extending therethrough in concentric relation to the shaft 57 and in vertically spaced relation to the disc 59. Thus, with the disc or fan rotating in the direction of the arrow, Fig. 7, or in a clockwise direction, it is obvious that material from the conveyer 54 will be discharged on the forward half of the disc 59 whereby it will be discharged to the right of the hopper. At the same time, material from the conveyer 53 will be discharged onto the disc 59 rearwardly of the shaft 57 whereby it will be distributed to the left of the hopper. In this connection, it should be noted that material is fed to the conduits 55 and 56 through a pair of spaced discharge openings 63 and 64 in the floor 62 of the minor hopper 20. As best seen in Figs. 4 and 6, the openings 63 and 64 in the floor of the minor hopper 20 are selectively opened and closed by a pair of independent and horizontally slidable plates 65 and 66 which are slidable atop the forward frame extension 21. Actuating rods 67 are horizontally disposed forwardly of the plates 65 and 66 and are fixedly attached thereto. The rods 67 are slidable in sleeves 68 fixed to the forward extension of the frame. The forward ends of the rods 67 have a pin and slot connection with the free end of bell cranks 69 each of which is operatively connected to an actuating arm 70 and 71. The bell cranks are fulcrumed for rotation atop the foremost portion of the forward frame extension 21 whereby they will be readily accessible to the operator of the tractor 10. Thus, by rocking the actuating arms 70 and 71 of the bell cranks in a counterclockwise direction, Fig. 6, it is obvious that the depending arms 69 thereof will throw the rods 67 forwardly and actuate either or both of the closure plates 65 and 66 rearwardly, whereby to close the openings 63 and 64 in the floor of the minor hopper 20. Obviously, when this occurs, no material will be distributed by the distributing fan.

As is readily apparent from Figs. 4 and 7, the fulcrum portions of the bell cranks cross each other, whereby the right hand actuating arm 70 operates the left hand closure plate 65 while the left hand actuating arm 71 actuates the right hand closure plate 66. This particular arrangement is merely one of expediency to provide a compact unit of a strong and sturdy nature and is not a necessary feature of the invention.

Distribution of the material from the conveyers 55 and 56 is confined to lateral direction by means of front and rear baffle members 72 and 73 which depend from the forward frame extension 21 forwardly and rearwardly of the fan 58.

To drive the fan 58, a suitable tubular shaft 74 is operatively and detachably connected to the power take-off shaft 14 of the tractor. The shaft 74 is operatively connected by universal joint 75 to a stub shaft 76 suitably journalled in the forward extension 21 of the frame. The stub shaft 76 is operatively connected in any suitable manner as by the chain and sprocket means 78 to a longitudinally extending shaft 79 which is preferably contained in a housing 80. The shaft 79 is connected by any suitable gearing, preferably automotive differential gearing, to the vertical shaft 57 to drive the same. In like manner, the shaft 79 is connected by the same gearing to a second and aligned shaft 81 which extends rearwardly from the housing 80 through the forward wall of the minor hopper 20, wherein the same is journalled. The free end of such shaft 81 has fixed thereon any suitable lump breaker 82 which comprises a rotatable blade which is rotatable in the hopper 20 in the region of the openings 43 from the major hopper 19 and also the openings 64 and 63 in the floor of the minor hopper 20. Thus, the blade 82 serves to break up any lumps in the material to be distributed whether the lumps are fed to the minor hopper 20 through the openings 43 or whether they were originally contained in the minor hopper 20. At the same time, by providing a differential gearing connection with the power take-off shaft of the tractor, the blade 82 will cease rotating if it encounters a rock or other large obstruction which it cannot break.

While the operation of the apparatus should be readily apparent from the foregoing, a brief statement of the operation will now be made. In the event that the user of the device has a requirement to distribute a relatively large amount of material, such as fertilizer, the main hopper 19 is filled, and the trailer is operatively connected to the tractor. While the trailer 16 is being transported to the field of operation, the plates 65 and 66 are closed, whereby no material is fed to the conveyers 53 and 54. At the same time, the gear shift handle 31 on the trailer is thrown to the neutral position, whereby the rotation of the wheels 18 of the trailer is not transmitted to the conveyer 42. Thus, no material is fed to the minor hopper 20. Upon reaching the field of operations, the transmission shift lever 31 is thrown to the desired speed at which it is desired to feed material to the minor hopper 20 and to the conveyers 53 and 54. At this time, also, if it has not already been done, the shaft 74 is operatively connected to the power take-off shaft of the tractor, whereby to cause the fan 58 to rotate. Thus, as the trailer is drawn along a continuous stream of material is distributed laterally of both sides thereof by the fan 58. However, in the event that the user is distributing fertilizer to substantially widely spaced trees in an orchard, he merely actuates the lever arms 70 and 71 to open the closures in the bottom of the hopper 20 at such times when he has the trailer positioned laterally opposite a tree or trees and closes such closures upon passing the tree or trees. Thus, no fertilizer is wasted in the spaces intermediate adjacent trees. Likewise, in the event but a single row of trees are to be fertilized, but a single one of the closures for the hopper 20 is opened, whereby fertilizer is distributed to but a single side of the device. By positioning the distributing fan 58 intermediate the trailer and the tractor, the operator of the tractor can readily gauge the proper time for opening and closing the closures of the hopper 20, whereby distribution of the fertilizer is accurately made at the desired points and is not made in a haphazard fashion as would be the case were the distributing fan located at the rear of the trailer 16. Likewise, by positioning the actuating arms 70 and 71 for the closure-operating bell cranks adjacent to the seat of the tractor, the operator of the tractor may readily actuate the same without leaving his seat or stopping the tractor. Thus, a distributing operation can be carried out with a minimum of wasted time and a minimum of wasted material. By providing the minor hopper 20 the same can be utilized for small jobs of distribution which would not justify the filling of the major hopper 19.

While I have shown and described what is now thought to be a preferred embodiment of the invention, it is to be understood that the same is susceptible of other forms and expressions. Consequently, I do not limit myself to the precise structure or structures shown and described hereinabove except as hereinafter claimed.

I claim:

1. In a trailer including ground wheels, said trailer being adapted to be drawn by a tractor including a power take-off shaft, and wherein said trailer includes a hopper for loose material; the improvement comprising a material distributing fan in adjacent relation to said hopper and mounted between the trailer and the tractor, means operatively connecting said fan to said power take-off shaft, said hopper being formed with a pair of discharge openings therein, a pair of driven conveyors for feeding material to opposite sides of said fan for distribution thereby in opposite directions, said driven conveyors positioned below the discharging openings and above the fan, a lump breaker comprising a rotatable blade spaced rearwardly of and in alignment with the hopper discharge openings, means mounting said blade in said hopper in the region of said discharge openings for said hopper, and means including differential gearing directly driven by said power take-off to drive said blade to rotate the latter.

2. In a trailer including ground wheels, said trailer being adapted to be drawn by a tractor, and wherein said trailer includes a hopper for loose material; the improvement comprising a material distributing fan, means for rotating said fan, means mounting said fan between said tractor and trailer, means for feeding material from said hopper to opposite sides of said fan for distribution thereby in opposite directions, said means for feeding material comprising a pair of driven conveyors, each formed with an intake opening communicating with said hopper and a discharge opening communicating with said fan, means for selectively closing at least one opening for each conveyor, said fan including a vertical axis and horizontal blades, one of said discharge openings being positioned in superjacent relation to said blades forwardly of said axis and the other of said discharge openings being positioned in superjacent relation to said blades rearwardly of said axis, whereby said material from said conveyors is distributed by said fan laterally of said hopper in opposite directions.

3. The structure of claim 2, baffle members depending from said fan mounting means forwardly and rearwardly, respectively, of said fan.

4. The structure of claim 2, a lump breaker comprising a rotatable blade, means mounting said blade in said hopper in the region of said intake openings for said conveyors, and means for rotating said blade.

5. The structure of claim 2, a lump breaker comprising a rotatable blade, means mounting said blade in said hopper in the region of said intake openings for said conveyors, and blade rotating means including differential gearing operatively connecting said blade to said power take-off.

6. In a distributor for loose material, the combination of a major hopper for said material and having a front wall and a bottom wall, a minor hopper forward and said major hopper and separated therefrom by the front wall of the latter, said front wall of the major hopper having an opening adjacent its bottom wall and communicating with said minor hopper, material feeding means in said major hopper and delivering material through said front wall opening, the latter having portions extending to opposite sides of said feeding means and through which material passes therefrom; a bottom in said minor hopper and having laterally spaced discharge openings therein receiving material from the respective side portions of the front wall opening of the major hopper, a pair of laterally spaced feed screws below said respective discharge openings and mounted in conduits having open front ends, a rotary discharge fan spaced below the front ends of said conduits for receiving the loose material and distributing the same from opposite sides thereof, differential gearing connected to the feed screws and driving the same, and a second differential gear means connected to and driving said rotary fan.

7. The structure set forth in claim 6, the material conduits being of different length and depositing loose material upon opposite sides of the fan.

8. The structure set forth in claim 6, and horizontally slidable closure plates for closing the discharge openings in the minor hopper and a bell crank and operating rod connecting each closure plate.

JAMES H. HOLBEN.

REFERENCES CITED

The following references are of record in the file of this patent:

UNITED STATES PATENTS

| Number | Name | Date |
|---|---|---|
| 1,619,795 | Roby | Mar. 1, 1927 |
| 1,940,008 | Mosgrove | Dec. 19, 1933 |
| 2,170,360 | Whelan | Aug. 22, 1939 |
| 2,200,165 | Fulkerson et al. | May 7, 1940 |
| 2,256,655 | Stewart | Sept. 23, 1941 |
| 2,281,212 | Stoltzfus | Apr. 28, 1942 |
| 2,430,020 | Johnson | Nov. 4, 1947 |